(12) United States Patent
Sakai

(10) Patent No.: US 7,578,564 B2
(45) Date of Patent: Aug. 25, 2009

(54) BRAKE HYDRAULIC PRESSURE CONTROL UNIT FOR VEHICLE

(75) Inventor: Moriharu Sakai, Kariya (JP)

(73) Assignee: Advics Co., Ltd., Kariya, Aichi (JP)

( * ) Notice: Subject to any disclaimer, the term of this patent is extended or adjusted under 35 U.S.C. 154(b) by 222 days.

(21) Appl. No.: 11/822,855

(22) Filed: Jul. 10, 2007

(65) Prior Publication Data

US 2008/0036295 A1 Feb. 14, 2008

(30) Foreign Application Priority Data

Aug. 11, 2006 (JP) ............................. 2006-220321

(51) Int. Cl.
*B60T 8/36* (2006.01)
(52) U.S. Cl. ..................... 303/119.3; 303/DIG. 10; 303/116.1
(58) Field of Classification Search .............. 303/119.3, 303/DIG. 10, DIG. 11, 119.2, 87
See application file for complete search history.

(56) References Cited

U.S. PATENT DOCUMENTS 6,132,011 A 10/2000 Iwamura et al.
7,237,851 B2 * 7/2007 Segawa .................... 303/119.3
2004/0090115 A1 * 5/2004 Inoue et al. .............. 303/119.3

FOREIGN PATENT DOCUMENTS

JP 10-59152 A 3/1998
JP 10-278771 A 10/1998

* cited by examiner

*Primary Examiner*—Melanie Torres
(74) *Attorney, Agent, or Firm*—Buchanan Ingersoll & Rooney PC

(57) ABSTRACT

A brake hydraulic pressure control unit includes motors mounted on one end of a hydraulic block so as to be aligned along a vertical direction. Each motor drives one of two sets of pumps. Solenoid valves and an electronic control unit are provided at the other end of the hydraulic block. Half of the solenoid valves and other component parts, which form a first hydraulic circuit, are provided in a vertically elongated area on the left-hand side of the pump mounting portions, and the other half of the solenoid valves and other component parts, which form a second hydraulic circuit, are provided in a vertically elongated area on the right-hand side of the pump mounting portions, with the component parts of each of the first and second hydraulic circuits overlapping each other in the lateral direction.

8 Claims, 4 Drawing Sheets

BRAKE HYDRAULIC PRESSURE CONTROL UNIT FOR VEHICLE

CROSS REFERENCE TO RELATED APPLICATIONS

This application is based on and claims priority under 35 U.S.C. sctn. 119 with respect to Japanese Patent Application No. 2006-220321 filed on Aug. 11, 2006, the entire content of which is incorporated herein by reference.

BACKGROUND OF THE INVENTION

The present invention relates to a brake hydraulic pressure control unit for a vehicle for controlling hydraulic pressures in the wheel cylinders mounted to the respective wheels of the vehicle based on commands from an electronic control unit.

Such brake hydraulic pressure control units, which are used in vehicle hydraulic brake systems having such functions as anti-lock brake control (ABS) and electronic stability control (ESC) functions, comprise a hydraulic block including a housing, and pumps and solenoid valves mounted to the housing, a motor for driving the pumps, and an electronic control unit including a motor driving circuit and solenoid valve control circuits. The solenoid valves include those for opening and closing brake fluid passages extending from the master cylinder to the wheel cylinders, and/or those for controlling hydraulic pressures in the respective wheel cylinders. A pressure sensor or sensors are optionally mounted in the hydraulic block.

Some of such brake hydraulic pressure control units have the motor mounted on one side of the hydraulic block and the electronic control unit mounted on the opposite side of the hydraulic block, as disclosed in JP patent publications 10-059152A and 10-278771A.

There is also known an arrangement in which the motor and the electronic control unit are provided on one side of the hydraulic block so as to be aligned in the axial direction of the motor. It may also be possible to provide the electronic control unit around the motor. But according to the type of vehicle, a brake hydraulic pressure control unit may be required in which the motor and the electronic control unit are mounted on one and the opposite sides of the hydraulic block, respectively, so as to face each other.

If such a brake hydraulic pressure control unit, which is mounted in the engine room of a vehicle, is too large in size (external dimensions), it may not be received in the installation space in the engine room according to the type of vehicle, and thus may not be mounted on the vehicle. It is therefore important that such control unit be as small in size as possible. But because in conventional arrangements of brake hydraulic pressure control units, their component parts forming the various circuits of the unit are typically arranged in the horizontal direction. This naturally results in increased lateral width (horizontal dimension) of the hydraulic block, thus making it more difficult to mount the control unit on a vehicle.

Many vehicles have their engine rooms designed such that vertically elongated brake hydraulic pressure control units can be more easily mounted therein than laterally elongated such units. But with brake hydraulic pressure control units in which the component parts forming the plurality of circuits thereof are arranged in the lateral direction, the lateral width of their hydraulic blocks is necessarily large. It is difficult to mount such control units in engine rooms designed such that vertically elongated units can be more easily mounted therein.

Ordinarily, after a brake hydraulic pressure control unit has been mounted in the engine room of a vehicle, external pipes are connected thereto from above the unit. In order to smoothly connect pipes to the unit, ports to be connected to the master cylinder, wheel cylinders and reservoir are formed in the hydraulic block at its upper portion. Thus, if the component parts forming each of a plurality of hydraulic circuits are arranged in the lateral direction, the brake fluid passages (oil lines) for each hydraulic circuit have to be markedly displaced in the lateral width direction in order to connect them to the respective ports while avoiding interference with component parts and brake fluid passages for the other hydraulic circuits. This naturally results in increased lateral width of the hydraulic block. In an arrangement in which component parts forming a first hydraulic circuit are provided on the substantially upper half portion of the hydraulic block and component parts forming a second hydraulic circuit are provided on the substantially lower half portion of the hydraulic block, with the component parts of each hydraulic circuit arranged in the lateral direction, it is necessary to connect the component parts provided on the lower half portion to the ports at the upper portion of the hydraulic block, while avoiding interference with the component parts provided on the upper half portion of the hydraulic block. This arrangement, therefore markedly increases the lateral width of the hydraulic block and thus the entire unit.

SUMMARY OF THE INVENTION

An object of the present invention is to reduce the width of a brake hydraulic pressure control unit of the type in which the motor and the electronic control unit are mounted on one and the opposite sides of the hydraulic block so as to face each other so that the unit can be mounted more easily on a vehicle.

In order to achieve this object, the present invention provides a brake hydraulic pressure control unit for a vehicle comprising:

a hydraulic block including a plurality of pumps each for drawing and feeding brake fluid to one of wheel cylinders configured to be mounted to respective wheels of the vehicle, and a plurality of solenoid valves for selectively opening and closing brake fluid passages extending from a master cylinder to the respective wheel cylinders and brake fluid passages extending from the respective wheel cylinders to a reservoir, and for individually controlling hydraulic pressures in the respective wheel cylinders, said plurality of pumps comprising first and second pumps for first and second hydraulic circuits, respectively;

motors for driving said first and second pumps, respectively; and an electronic control unit for controlling said solenoid valves and said motors, said hydraulic block having ports connected to the master cylinder, the wheel cylinders and the reservoir, respectively, at an upper portion thereof;

wherein said motors are provided at a first end of said hydraulic block so as to be aligned along a vertical axis of said hydraulic block, and said plurality of solenoid valves and said electronic control unit are provided at a second end of said hydraulic block that is opposite said first end; and wherein when an end surface of said hydraulic block at said second end is viewed from a direction perpendicular to said end surface, component parts forming said first hydraulic circuit are provided in a first vertically elongated area on the right-hand side of pump mounting portions in which said pumps are mounted, and component parts forming said second hydraulic circuit are provided in a second vertically elongated area on the left-hand side of said pump mounting portions, said component parts in each of said first and second vertically elongated areas overlapping each other in a direction perpendicular to said vertical axis.

With this arrangement, because the component parts forming the first and second hydraulic circuits are disposed in the first and second vertically elongated areas on the right-hand and left-hand sides of the pump mounting portions, respectively, it is possible to minimize the lateral width of the unit while avoiding interference of brake fluid passages with the respective component parts of the first and second hydraulic circuits. Since the component parts forming each of the first and second hydraulic circuits are arranged in the corresponding vertically elongated area so as to overlap each other in a direction perpendicular to the vertical axis, it is possible to further reduce the lateral width of the unit.

The pumps may be piston pumps, but is more preferably rotary pumps, typically gear pumps.

By using rotary pumps instead of piston pumps, it is possible to provide a quieter and smaller brake hydraulic pressure control unit.

The motors may be either brush motors or brushless motors. But for higher performance of the brake hydraulic pressure control unit, brushless motors are advantageous.

By using brushless motors instead of brush motors, it is possible to improve the responsiveness of the brake hydraulic pressure control unit, and thus its performance.

Preferably, the electric systems for the first and second hydraulic circuits are provided independently of each other.

With this arrangement, even if e.g. a wire is broken in one of the electric systems for the first and second hydraulic circuits, because the other electric system is functioning normally, safety of the vehicle is maintained.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
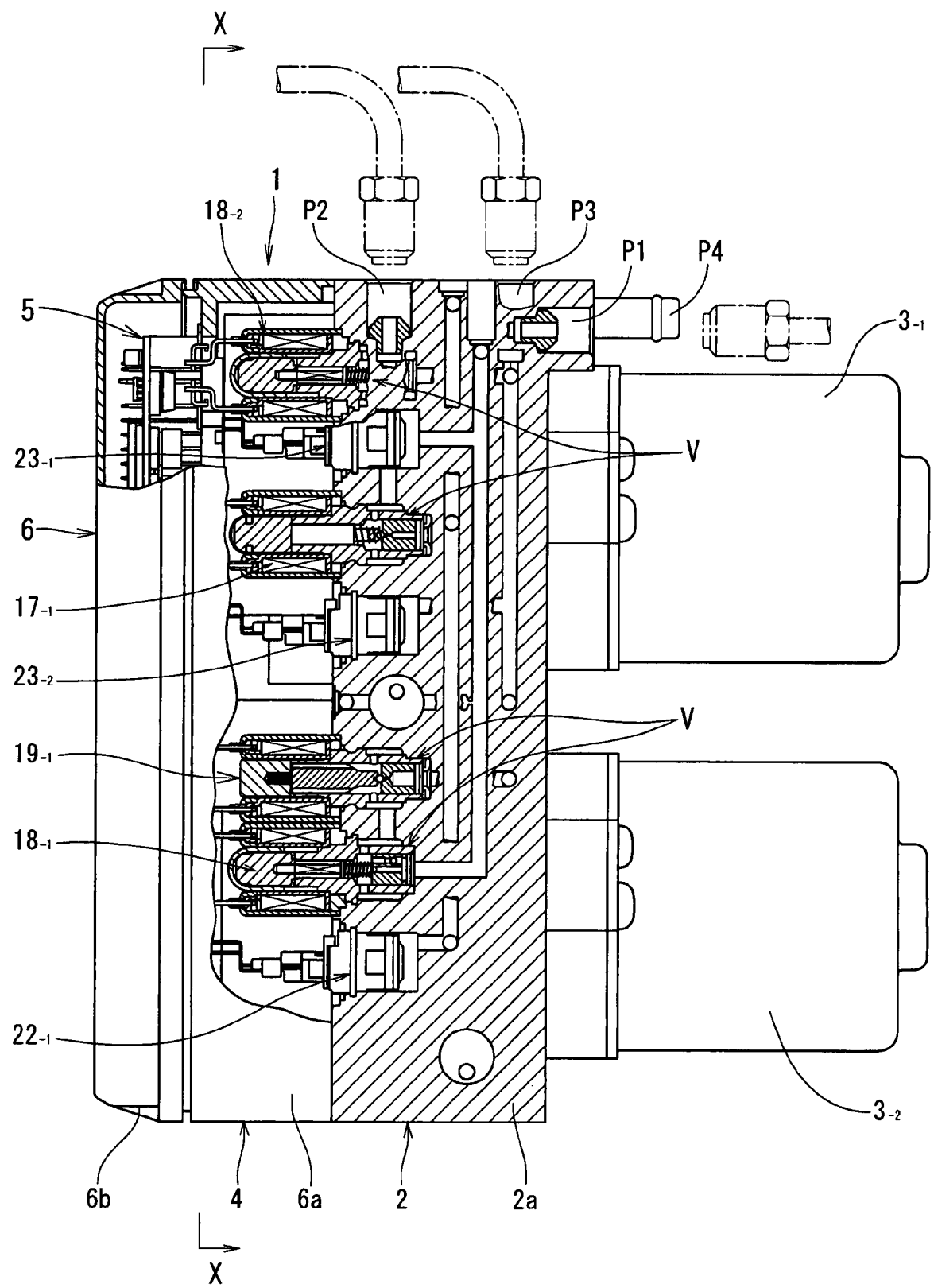
FIG. 1 is a partially cutaway side view of a brake hydraulic pressure control unit embodying the present invention.
Figure 2:
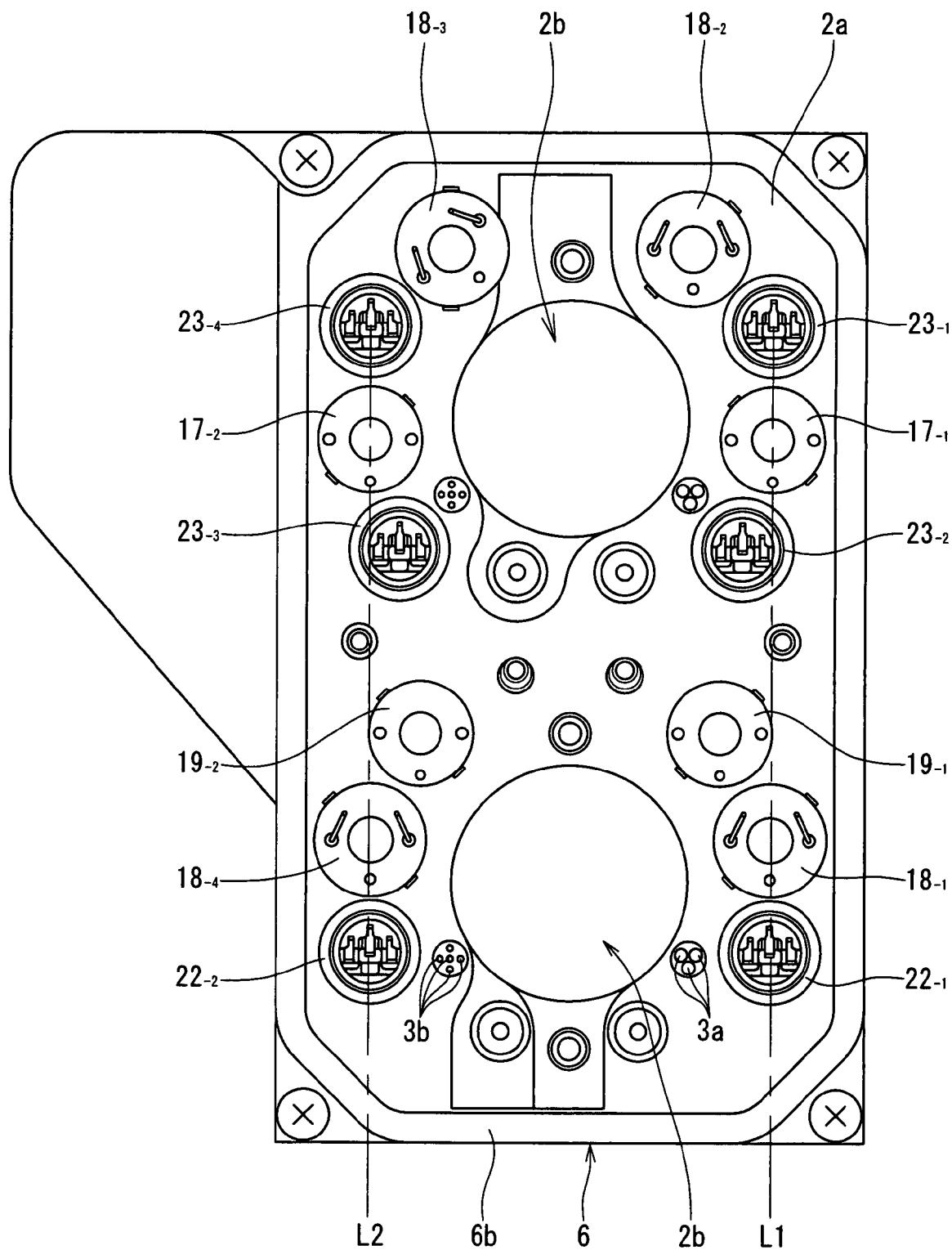
FIG. 2 is a sectional view taken along line X-X of FIG. 1.
Figure 3:
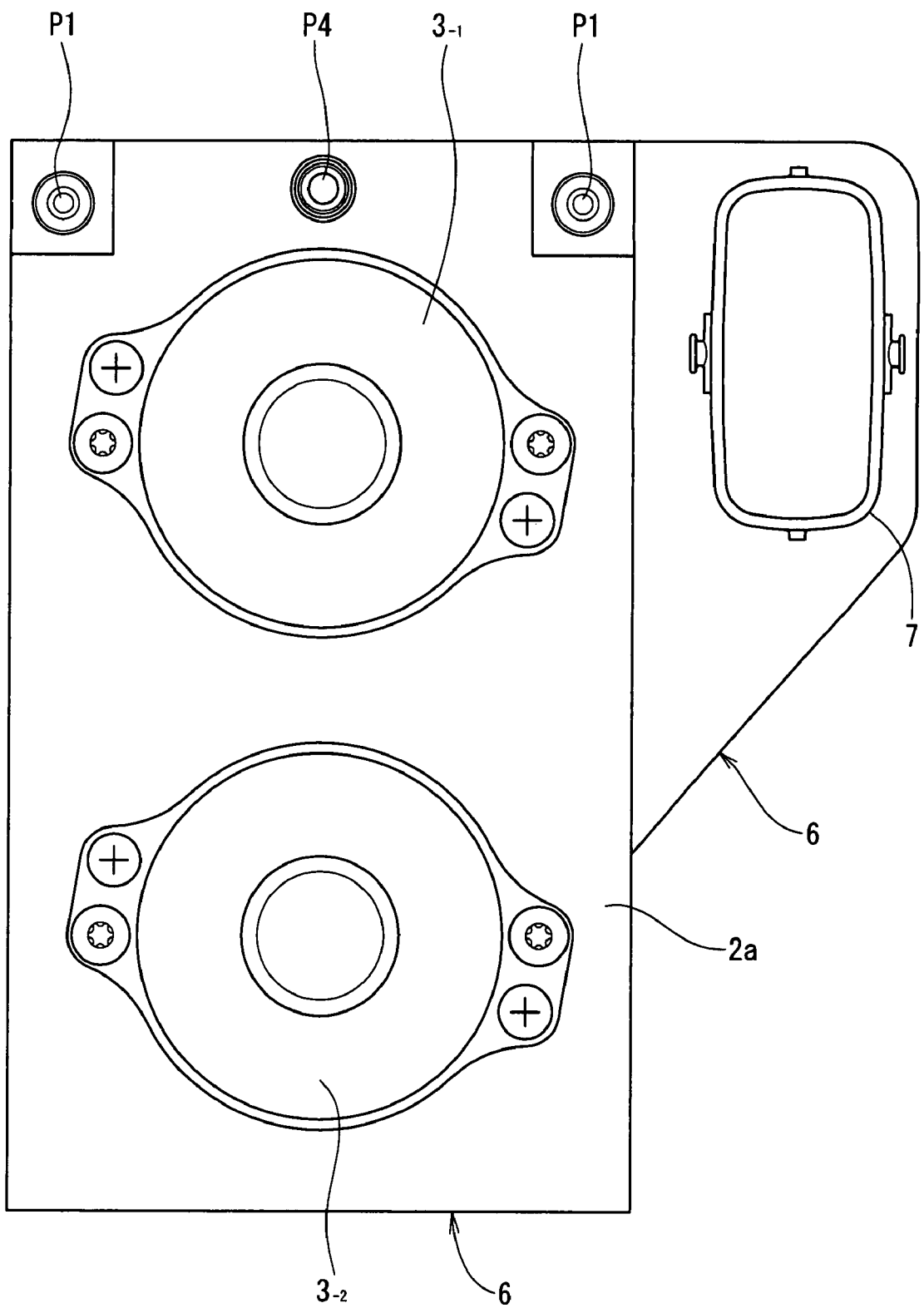
FIG. 3 is a right-hand end view of the brake hydraulic pressure control unit of FIG. 1.

Now the embodiment of the present invention is described with reference to FIGS. 1 to 4. In the description and the drawings, any plurality of identical elements are individually denoted by identical main numbers with different sub-numbers (-1, -2, -3 . . . ) attached thereto. FIGS. 1 to 3 show a brake hydraulic pressure control unit 1 embodying the present invention, which comprises a hydraulic block 2, motors 3-1 and 3-2, and an electronic control unit 4.

Figure 4:
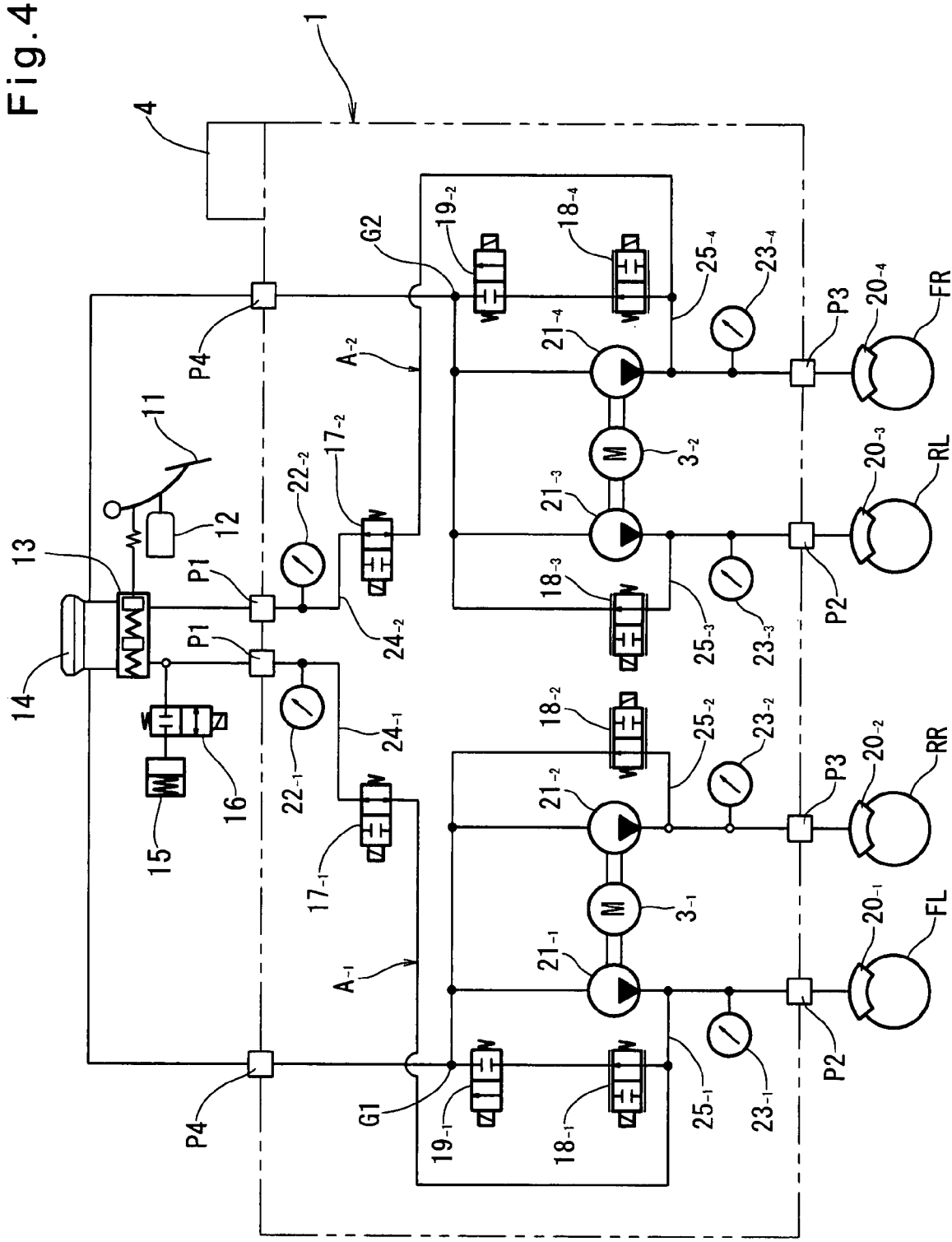
FIG. 4 is a circuit diagram of a brake system having an electronic stability control (ESC) function.

FIG. 4 shows a circuit configuration of a brake system of the brake-by-wire type which includes four pumps each provided for one of the four wheels of the vehicle, and two motors each for individually driving two of the four pumps. The brake hydraulic pressure control unit of FIGS. 1 to 3 is used in the brake system of FIG. 4. The brake system of FIG. 4 is first described.

The brake system of FIG. 4 includes a brake operating member (typically a brake pedal as shown), a stepping force sensor 12 for detecting the degree of operation of the brake operating member 11 (which may be replaced with a stroke sensor), a tandem master cylinder 13 including a reservoir 14, a stroke simulator 15, a solenoid valve 16 for controlling the stroke of the brake pedal, normally open solenoid valves (on-off valves) 17-1 and 17-2, and solenoid valves 18-1 to 18-4 (linear control valves) each for controlling the brake hydraulic pressure to be supplied to one of the wheel cylinders to a value corresponding to the control current applied thereto, and normally closed solenoid valves 19-1 and 19-2 (on-off valves). The brake system of FIG. 4 further includes wheel cylinders 20-1 to 20-4 mounted on the respective wheels, i.e. the front right wheel FR, front left wheel FL, rear right wheel RR and rear left wheel RL, pumps 21-1 to 21-4 each for one of the wheel cylinders 20-1 to 20-4, and pressure sensors 22-1 and 22-2 and 23-1 to 23-4.

The brake system of FIG. 4 has a diagonal brake circuit layout, with the wheel cylinders 20-1 and 20-2 of the front left wheel FL and the rear right wheel RR connected to a first hydraulic circuit A-1 and the wheel cylinders 20-3 and 20-4 of the rear left wheel RL and the front right wheel FR connected to a second hydraulic circuit A-2, and is capable performing anti-lock brake control (ABS), traction control (TRC) and electronic stability control (ESC).

The pumps 21-1 and 21-2 are mounted in the first hydraulic circuit A-1, while the pumps 21-3 and 21-4 are mounted in the second hydraulic circuit A-2. The pumps 21-1 and 21-2 constitute tandem pumps and are driven by the motor 3-1. The pumps 21-3 and 21-4 also constitute tandem pumps and are driven by the motor 3-2.

The first hydraulic circuit A-1 includes a brake fluid passage 24-1 extending from the master cylinder 13 to the wheel cylinders 20-1 and 20-2, and brake fluid passages 25-1 and 25-2 extending from the respective wheel cylinders 20-1 and 20-2 to the reservoir 14. Similarly, the second hydraulic circuit A-2 includes a brake fluid passage 24-2 extending from the master cylinder 13 to the wheel cylinders 20-3 and 20-4, and brake fluid passages 25-3 and 25-4 extending from the respective wheel cylinders 20-3 and 20-4 to the reservoir 14. Solenoid valves 17-1 and 17-2 are provided in the brake fluid passages 24-1 and 24-2, respectively. In the brake fluid passage 24-1 of the first hydraulic circuit A-1, a stroke control valve 16 and a stroke simulator 15 are further provided upstream of the solenoid valve 17-1, i.e. between the solenoid valve 17-1 and the master cylinder 13. The pumps 21-1 to 21-4 are provided in the respective hydraulic circuits A-1 and A-2, downstream of the respective solenoid valves 17-1 and 17-2, i.e. between the solenoid valves 17-1 and 17-2 and the wheel cylinders, to draw brake fluid and supply the thus drawn brake fluid to the respective wheel cylinders 20-1 to 20-4.

The solenoid valves 18-1 to 18-4 are provided in the respective brake fluid passages 25-1 to 25-4, which extend from the respective wheel cylinders 20-1 to 20-4 to the reservoir 14. The brake fluid passages 25-1 and 25-2 meet at a junction G1, while the brake fluid passages 25-3 and 25-4 meet at a junction G2. The brake fluid passages 25-2 and 25-3 also serve as suction passages for the pumps. The solenoid valve 19-1 is provided in the brake fluid passage 25-1 at its point nearer to the reservoir 14 than is the solenoid valve 18-1 and nearer to the wheel cylinder 20-1 than is the junction G1. The solenoid valve 19-2 is provided in the brake fluid passage 25-4 at its point nearer to the reservoir 14 than is the solenoid valve 18-4 and nearer to the wheel cylinder 20-4 than is the junction G2.

When the brake pedal of the brake system of FIG. 4 is operated by the driver with its electric system operating normally, an electronic control unit 4 (which is mounted on a solenoid valve circuit substrate to be described below) closes the solenoid valves 17-1 and 17-2, and opens the solenoid valve 16 while keeping the solenoid valves 18-1 to 18-4 open. Simultaneously, the electronic control unit activates the motors 3-1 and 3-2 to draw brake fluid in the reservoir 14 into the pumps 21-1 to 21-4 and supply the thus drawn brake fluid to the wheel cylinders 20-1 to 20-4, thereby applying brakes to the wheels. The brake system operates in the same manner during automatic braking, too, i.e. when the brakes are applied with the brake pedal not being operated by the driver.

When the electronic control unit determines that it is necessary to start hydraulic pressure control for a particular circuit or circuits based on information from sensors for detecting the behavior of the wheels and the vehicle (such as the pressure sensors and the stepping force sensor shown in FIG. 4 and other sensors not shown, such as wheel speed sensors, a yaw rate sensor and a lateral G-sensor), the electronic control unit controls the linear control valves of the particular circuit or circuits (and opens the solenoid valves 19-1 and 19-2, if necessary) to control the hydraulic pressures of the corresponding wheel cylinder or cylinders.

In the arrangement of FIG. 4, even if one of the first and second hydraulic circuits A-1 and A-2 fails, brakes can be applied to the two diagonally opposed wheels of the other circuit. If both the first and second hydraulic circuits fail, the pumps become unable to apply braking pressure to any of the wheel cylinders. In this case, the electronic control unit opens the solenoid valves 17-1 and 17-2 and closes the solenoid valve 16 and the solenoid valves 19-1 and 19-2 to apply the hydraulic pressure produced in the master cylinder 13 to the respective wheel cylinders.

The hydraulic block 2 of the brake hydraulic pressure control unit 1 shown in FIGS. 1-3 includes a housing 2a to which the elements enclosed in the chain line of FIG. 4, except the motors 3-1 and 3-2, are mounted. The housing 2a has ports P1 leading to the master cylinder 13, ports P2 and P3 leading to the wheel cylinders 20-1 and 20-3 and 20-2 and 20-4, respectively, and ports P4 leading to the reservoir 14 (in FIG. 1, only ports in one of the two hydraulic circuits are shown). The brake fluid passages enclosed in the chain line of FIG. 4 are formed in the housing 2a. The pumps 21-1 to 21-4 of FIG. 4, which constitute two sets of parallel tandem pumps, are mounted in the housing 2a. Also mounted in the housing 2a are the valve portions V of the solenoid valves 17-1 and 17-2, 18-1 to 18-4 and 19-1 and 19-2 (only partially shown), and the pressure sensors 22-1, 22-2 and 23-1 to 23-4.

The motors 3-1 and 3-2 are mounted on one end of the hydraulic block 2 so as be aligned in a vertical direction.

The pumps 21-1 to 21-4 are preferably rotary pumps such as gear pumps (internal gear pumps) because gear pumps are quiet in operation, and small in projected area as seen from the top of the unit 1. The two sets of pumps 21-1 and 21-2 and 21-3 and 21-4 are mounted in the housing 2a separately from each other and driven by the respective motors 3-1 and 3-2 independently of each other. The motors are mounted on a first end surface of the housing 2a. From a second end surface of the housing 2a which is opposite to the first end surface, two protrusions extend in the axial direction of the motors 3-1 and 3-2. The two protrusions serve as pump mounting portions 2b in which the respective sets of pumps are mounted.

Component parts of the first and second hydraulic circuits A-1 and A-2 (solenoid valves 17-1, 17-2, 18-1 to 18-4, 19-1 and 19-2, and pressure sensors 22-1, 22-2 and 23-1 to 23-4 in the embodiment) are all mounted to the second end surface of the housing 2a. When the second end surface is viewed in the direction perpendicular to this second end surface, the pump mounting portions 2b are aligned along a vertical central axis of the housing, and the component parts of the first hydraulic circuits A-1 and those of the second hydraulic circuits A-2 are provided, respectively, in the vertically elongated areas of the second end surface on the right-hand and left-hand sides of the pump mounting portions 2b.

With this arrangement, it is possible to minimize the lateral width of the housing, i.e. the dimension perpendicular to the vertical axis of the housing, without the possibility of any of the component parts of the hydraulic circuits from interfering with the brake fluid lines formed in the housing 2a. This is because the component parts of each of the hydraulic circuits can be aligned along a single line parallel to the central vertical axis of the housing, with the component parts of each of the hydraulic circuits overlapping each other in the direction perpendicular to the vertical axis of the housing. In a specific arrangement, the component parts of the first hydraulic circuit, i.e. the pressure sensor 22-1, solenoid valves 17-1 and 18-1, and pressure sensor 23-1 are aligned along a vertical line L1, and the component parts of the second hydraulic circuit, i.e. the pressure sensor 22-2, solenoid valves 17-2 and 18-4 and pressure sensor 23-4 are aligned along a vertical line L2. Further, as shown in FIG. 1, the component parts of the first hydraulic circuit are connected to ports P2 and P3, which are provided at the top end of the housing 2a, through brake fluid passages that are arranged in a single common plane including the line L1. (In FIG. 1, these passages are only partially shown.) Similarly, though not shown, the component parts of the second hydraulic circuit are connected to ports P2 and P3 through brake fluid passages that are disposed in a single common plane including the line L2. With this arrangement, it is possible to reduce the lateral width of the hydraulic block 2, so that the brake hydraulic pressure control unit 1 including such a hydraulic block 2 can be mounted on a vehicle of which the lateral width of the installation space for such a unit is limited.

The motors 3-1 and 3-2 may be brush motors. But in the embodiment, brushless motors are preferably used because by using brushless motors, which are higher in responsiveness than brush motors, it is possible to increase the rising speed of brake hydraulic pressure produced by the pumps, thereby improving the responsiveness of braking.

The electronic control unit 4 comprises a circuit substrate 5 on which motor driving circuits and control circuits for the solenoid valves are mounted, and a case 6 in which are received the coil portions of the solenoid valves and the exposed portions of the pressure sensors.

The case 6 comprises a cylindrical body 6a which is liquid-tightly mounted to one side of the housing 2a by tightening screws, and a cover 6b closing the opening of the body 6a. The case 6 may have its cover 6b fixed to the body 6a by heat-fusing as shown or by any other means. The case 6 has a connector portion 7 to which a harness is connected through which the circuits of the electronic control unit 4 are connected to a power source.

The motor driving circuits and other electric circuits formed on the circuit substrate 5, such as the control circuits for the solenoid valves, comprise circuits for the first hydraulic circuit A-1 and circuits for the second hydraulic circuit A-2 which are provided and operate independently of the corresponding circuits for the first hydraulic circuit A-1. With this arrangement, even if one of the electric systems for the first and second hydraulic circuits encounters any problem such as a broken wire, because the other electric system is functioning normally, it is possible to apply brakes to at least one front wheel and the one rear wheel diagonally opposite to the one wheel. This improves the safety of the vehicle.

Power source terminals 3a and signal circuit terminals 3b for the respective motors (see FIG. 2), as well as terminals for the solenoid valves and pressure sensors are connected to the corresponding electric circuits on the circuit substrate 5.

What is claimed is:

1. A brake hydraulic pressure control unit for a vehicle comprising:

a hydraulic block including a plurality of pumps each for drawing and feeding brake fluid to one of wheel cylinders configured to be mounted to respective wheels of the vehicle, and a plurality of solenoid valves for selectively opening and closing brake fluid passages extending from a master cylinder to the respective wheel cylinders and brake fluid passages extending from the respective wheel cylinders to a reservoir, and for individually controlling hydraulic pressures in the respective wheel cylinders, said plurality of pumps comprising first and second pumps for first and second hydraulic circuits, respectively;

motors for driving said first and second pumps, respectively; and an electronic control unit for controlling said solenoid valves and said motors, said hydraulic block having ports connected to the master cylinder, the wheel cylinders and the reservoir, respectively, at an upper portion thereof;

wherein said motors are provided at a first end of said hydraulic block so as to be aligned along a vertical axis of said hydraulic block, and said plurality of solenoid valves and said electronic control unit are provided at a second end of said hydraulic block that is opposite to said first end; and wherein when an end surface of said hydraulic block at said second end is viewed from a direction perpendicular to said end surface, component parts forming said first hydraulic circuit are provided in a first vertically elongated area on the right-hand side of pump mounting portions in which said pumps are mounted, and component parts forming said second hydraulic circuit are provided in a second vertically elongated area on the left-hand side of said pump mounting portions, said component parts in each of said first and second vertically elongated areas overlapping each other in a direction perpendicular to said vertical axis.

2. The brake hydraulic pressure control unit of claim 1 wherein said pumps are rotary pumps.

3. The brake hydraulic pressure control unit of claim 1 wherein said motors are brushless motors.

4. The brake hydraulic pressure control unit of claim 2 wherein said motors are brushless motors.

5. The brake hydraulic pressure control unit of claim 1 wherein electric systems for said first and second hydraulic circuits are provided independently of each other.

6. The brake hydraulic pressure control unit of claim 2 wherein the electric systems corresponding to said first and second hydraulic circuits are provided independently of each other.

7. The brake hydraulic pressure control unit of claim 3, wherein the electric systems corresponding to said first and second hydraulic circuits are provided independently of each other.

8. The brake hydraulic pressure control unit of claim 4 wherein the electric systems corresponding to said first and second hydraulic circuits are provided independently of each other.

* * * * *